(12) United States Patent
Obara et al.

(10) Patent No.: US 8,622,421 B2
(45) Date of Patent: Jan. 7, 2014

(54) CURTAIN BAG

(75) Inventors: Kazuyuki Obara, Matsuura (JP);
Masatoshi Yoshida, Matsuura (JP);
Yoshinori Kami, Matsuura (JP)

(73) Assignee: Sumisho Airbag Systems Co., Ltd., Nagasaki (JP)

( * ) Notice: Subject to any disclaimer, the term of this patent is extended or adjusted under 35 U.S.C. 154(b) by 0 days.

(21) Appl. No.: 13/512,529

(22) PCT Filed: Nov. 1, 2010

(86) PCT No.: PCT/JP2010/069400
§ 371 (c)(1),
(2), (4) Date: May 29, 2012

(87) PCT Pub. No.: WO2011/065189
PCT Pub. Date: Jun. 3, 2011

(65) Prior Publication Data
US 2012/0235391 A1    Sep. 20, 2012

(30) Foreign Application Priority Data
Nov. 30, 2009 (JP) ................................. 2009-271123

(51) Int. Cl.
*B60R 21/232* (2011.01)
*B60R 21/2334* (2011.01)
(52) U.S. Cl.
USPC .................. 280/730.2; 280/743.1; 280/730.1
(58) Field of Classification Search
USPC ................... 280/743.1, 730.2, 730.1
See application file for complete search history.

(56) References Cited

U.S. PATENT DOCUMENTS

| | | | |
|---|---|---|---|
| 6,010,149 A | 1/2000 | Riedel et al. | |
| 6,220,625 B1 * | 4/2001 | Wallner et al. | 280/730.2 |
| 6,394,487 B1 | 5/2002 | Heudorfer et al. | |
| 6,616,178 B1 * | 9/2003 | Nanbu | 280/730.2 |
| 7,556,288 B2 * | 7/2009 | Zauritz et al. | 280/730.2 |
| 8,276,938 B2 * | 10/2012 | Yamamoto et al. | 280/730.2 |
| 2001/0026062 A1 * | 10/2001 | Kosugi et al. | 280/730.2 |
| 2005/0082797 A1 * | 4/2005 | Welford et al. | 280/730.2 |

(Continued)

FOREIGN PATENT DOCUMENTS

| | | |
|---|---|---|
| JP | 2001-171471 A | 6/2001 |
| JP | 2001-328503 A | 11/2001 |
| JP | 2006-500268 A | 1/2006 |
| JP | 2007-161167 A | 6/2007 |
| WO | WO 2009/008350 A1 | 1/2009 |

OTHER PUBLICATIONS

International Search Report for PCT/JP2010/069400 dated Dec. 7, 2010.

*Primary Examiner* — Drew Brown
(74) *Attorney, Agent, or Firm* — Birch, Stewart, Kolasch & Birch, LLP

(57) ABSTRACT

Disclosed is a curtain bag that can obtain a necessary inflated state in a short period of time without applying excessive localized force to a peripheral joining section or an inner joining section, and that is improved in the ability to suppress the ejection of passengers out from a vehicle specifically by a lateral collision. A portion of the curtain bag and/or the peripheral edge is shaped so as to snag the bottom sill of a window, and the inner joining section of the region that contacts the section below the bottom sill of the window is shaped with a plurality of dots and/or given an expandable form across effectively the entire surface and/or given a form that has increased bending stiffness.

3 Claims, 7 Drawing Sheets

(56) References Cited

U.S. PATENT DOCUMENTS

| | | | |
|---|---|---|---|
| 2005/0134022 A1* | 6/2005 | Noguchi et al. | 280/728.2 |
| 2005/0161917 A1* | 7/2005 | Stevens | 280/730.2 |
| 2006/0125213 A1 | 6/2006 | Kruse | |
| 2007/0138778 A1 | 6/2007 | Takemura et al. | |
| 2010/0171293 A1 | 7/2010 | Yamamoto et al. | |

* cited by examiner (a) MAT WEAVE     (b) REVERSIBLE FIGURED     (c) PLAIN WEAVE

CURTAIN BAG

TECHNICAL FIELD

The present invention relates to a curtain bag (also called an inflatable curtain or a curtain air bag) which inflates a bag between a side window section of an automobile and an occupant to reduce impact on a head of the occupant, for the purpose of mainly protecting the head of the occupant, when a side of the automobile collides with another automobile or an obstacle. Particularly, the present invention relates to a curtain bag which is excellent in an ability to suppress ejection of the occupant out from the vehicle by the collision.

BACKGROUND ART

Most passenger cars which are manufactured at present are loaded with so-called air bags for a driver's seat and a front passenger seat in order to ensure safety of the occupants by rapidly inflating bag bodies between the occupants and an automobile interior structure when the front of the automobile collides (collides head-on) with another automobile or an obstacle.

In recent years, in order to protect heads of occupants not only at the time of a head-on collision but also at a time of a side of an automobile colliding with another automobile or an obstacle (lateral collision), curtain bag systems begin to be really loaded, which inflate curtain bags stored by being folded in ceiling portions and pillar portions above side window sections of the automobiles to cover the side window sections at the time of collision.

Conventionally, the curtain bag shown in Patent Document 1 is known as one example of a curtain bag. The curtain bag of Patent Document 1 is configured in such a way that two pieces of coated fabric are joined to each other at a peripheral joining section which is provided at a peripheral edge to define an outer peripheral shape of the bag, and inner joining section provided at an inner side of the peripheral joining section, as shown in FIG. 13. The inner joining section defines the inflated shape of an inflation section (section to be inflated by introduction of a gas), and is provided to be a straight line, a curved line, or a U-shaped configuration with both of former lines being combined which are continuing to the peripheral joining section. Further, the curtain bag shown in Patent Document 1 has a gas inflow port to which a gas generator (inflator) is connected, in an upper portion at a rear side of the curtain bag.

A curtain bag shown in Patent Document 2 is known as a new curtain bag. The curtain bag of Patent Document 2 is configured in such a way that two pieces of fabric are joined at a peripheral joining section which is provided at a peripheral edge to define an outer peripheral shape of the bag, and a plurality of dot-shaped inner joining sections which are provided at an inner side of the peripheral joining section and are independent from one another. The curtain bag has the feature of smooth and quick inflow of a gas from a gas generator (inflator) and fast deployment by being provided with the dot-shaped inner joining sections.

In formation of the above described peripheral joining section and inner joining sections, a method by machine-sewing, and a method which forms a joining section by interlacing weaving yarns with each other in a predetermined position and into a predetermined shape at a weaving stage by using a loom loaded with a Jacquard loom (hereinafter, referred to as an OPW method) are put to practical use. Further, there is a type having a gas inflow port at an upper portion of a bag. Further, there are two curtain bag systems: one simply protects occupants only shortly after a lateral collision occurs (first impact corresponding type) and the other also considers the protection of the occupants in case where an automobile rolls over after a lateral collision (roll over corresponding type).

PATENT DOCUMENTS

Patent Document 1: U.S. Pat. No. 6,010,149
Patent Document 2: International Publication No. WO 2009/008350

SUMMARY OF INVENTION

Technical Problem

By the way, in case of assuming a lateral collision, a distance between an occupant and an automobile interior structure to which the occupant is hit corresponds to a distance between the occupant and a side window section. The distance is small as compared with a distance between the occupant in a driver's seat and a steering wheel, and a distance between a front-seat occupant and an instrument panel in case of assuming a head-on collision. Accordingly, as one of important required performances of a curtain bag, it is required that a gas properly flow into necessary portions in a short time period and the bag be inflated to a predetermined internal pressure by the time when the head of an occupant comes in contact with the bag.

However, in the conventional curtain bag, several relatively large inflation sections are formed by a small number of inner joining sections in the shape of a straight line, a curved line, or a U-shaped configuration, which consists of a combination of both former lines which are continuing to the peripheral joining section, as shown in FIG. 13. Therefore, the flow velocity of the gas in the bag is low, and it is difficult to distribute the gas from the gas generator to the inflation sections in a short time. Especially in the curtain bag in which the inner joining section is formed into a U-shape and inflation sections called cells or cabins are formed, such a phenomenon occurs that some cabins are inflated, but the other cabins which should be inflated are still in the inflating process.

Further, since the gas from the gas generator cannot be properly distributed quickly, the internal pressure is locally increased, and an excessive force is exerted on the peripheral joining section and the inner joining section around this particular portion. Furthermore, the conventional curtain bag has several inflation sections, and the volumetric capacity of one inflation section is large. Therefore, the force which is exerted on the peripheral joining section and the inner joining section is large.

Accordingly, in the conventional curtain bag, a localized increase of the internal pressure and the volumetric capacity of the inflation section are large, whereby a localized excessive force is easily applied to the peripheral joining section and the inner joining section, and the bag may burst in the process of inflation of the bag. Further, even if the bag does not lead to bursting, there are some cases where a gas flows out due to partial breakage and peeling-off of the coating film and a predetermined internal pressure necessary for protection of an occupant cannot be obtained. Especially in a roll over corresponding type curtain bag, it may be difficult to keep a predetermined internal pressure for a predetermined time period.

Accordingly, there is a method which reduces the above described phenomenon by attaching a gas distribution member, which is generally called an inner tube, to a duct of a gas generator in a curtain bag. However, the bag becomes heavy, storability being reduced, and the cost of the bag increasing. Further, in bags of an OPW method, in order to cope with the above described phenomenon, the strength of woven fabric is intended to be increased and gas leak due to an aperture of the peripheral joining section and the inner joining section is intended to be prevented. For this purpose, it is required that woven fabric with high density be formed with yarns with high fineness, and a large quantity of coating agent be applied to the fabric. In a machine-sewn type bag, partial reinforcement is performed, and two pieces of fabric are sewn up with a thick seal material interposed between the two pieces of fabric in the peripheral joining section and the inner joining sections. In either case, the bag becomes heavy and bulky, storability becoming worse, and the cost increasing, as the result of the above countermeasures.

In the conventional curtain bag, the inflation sections are often formed into U-shaped cabins as shown in FIG. 14. In the case of the bag in this shape, as is shown in the region indicated by X of FIG. 14, the peripheral joining section 101 and the inner joining section 102 tend to be formed in specific warp yarns/or specific weft yarns as compared with in the other warp yarns and/or the other weft yarns.

In the peripheral joining section and the inner joining sections of the curtain bag of an OPW method, two pieces of fabric are woven into one piece of fabric by interlacing the weaving yarns of the two pieces of fabric. Thus, the weave density is doubled as compared with that in the inflation section where the two pieces of fabric are separated, and also the bending rates of weaving yarn of the peripheral joining section and the inner joining sections are greater than that of the inflation section. Therefore, the warp yarns (or the weft yarns) which more frequently form the peripheral joining section and the inner joining sections are woven with a higher tensile force in the weaving stage as compared with the warp yarns (or the weft yarns) which less frequently form the peripheral joining section and the inner joining sections. As a result, a distortion internally exists in the woven fabric, and contraction and wrinkles may be caused between both of them. The contraction and wrinkles cause inconvenience in the following processes. For example, in the coating process, the contraction and wrinkles cause an occurrence of uneven coating of the coating agent, and in the cutting process, the contraction and wrinkles cause faulty cutting into a predetermined shape and size.

Further, when the rate of concentration of the peripheral joining section and the inner joining sections onto the specific warp yarns (or threads weft yarns) is high, stress concentration easily occurs at the boundary portions between the peripheral joining section and the inner joining sections at the stage in which the curtain bag inflates. Thus, the boundary sections may become the start points of breakage of the curtain bag. In a machine-sewn type curtain bag, after ordinary plain weave fabric is woven, coated, and cut, two pieces of the fabric are sewn up. Therefore, stress does not internally exist at the weave stage as in an OPW method. However, when the rate of concentration of the peripheral joining section and the inner joining sections (seamed sections) onto the specific warp yarns (or weft yarns) is high, the load-elongation percentage characteristics of the peripheral joining section, the inner joining sections, and the inflation section differ from each other, so that stress concentration is easily caused to the sections, as described above.

Furthermore, since the conventional curtain bag has several inner joining sections, the design of the curtain bag needs to be determined so that the injury value of a dummy head becomes a reference value or less in a collision test, in accordance with the shape of an automobile, in particular, the roof shape, and the seating position of an occupant. Accordingly, a large number of man-hours of design and tests and an extremely long period are required for determination of the shape of a curtain bag for each vehicle model.

Further, under current laws and regulations, the injury value standards only have to be satisfied with the specified regular seating posture of a dummy. However, actually, there are various seating postures of occupants, and a sufficient protection effect is unlikely to be expected depending on the posture.

Furthermore, in order to respond to the demand for higher safety, the performance required of curtain bags has been much higher. For example, suppression of ejection of occupants out from a vehicle at the time of a lateral collision and a roll-over of the automobile thereafter is being required. However, since the conventional curtain bag is designed without consideration of suppression of ejection out from a vehicle, it is unlikely to be sufficient in suppression of ejection out from a vehicle.

It is an object of the present invention to obtain a necessary inflated state of a curtain bag in a short period of time without applying excessive localized force to a peripheral joining section or an inner joining section. Particularly, it is an object of the present invention to improve an ability to suppress ejection of occupants out from a vehicle especially by a lateral collision.

Solution to Problem

The present invention provides a curtain bag, in which at least two pieces of fabric are joined to each other at least at a peripheral joining section provided at a peripheral edge, and an inner joining section provided at an inner side of the peripheral joining section, wherein in order to suppress ejection of an occupant out from a vehicle, a portion of the curtain bag and/or the outer edge is shaped so as to catch a bottom sill of a window at a time of inflation and deployment, and the inner joining section of a region that contacts a section below the bottom sill of the window is shaped with a plurality of dots. A maximum thickness at a time of inflation in an occupant protection region may be 100 to 250 mm. And/or, the present invention provides a curtain bag wherein the curtain bag has a form inflatable substantially across an entire surface of the curtain bag, and thereby, a tensile force of the fabric being increased. And/or, the present invention provides a curtain bag wherein a length of the single inner joining section projected in a width direction is 2 to 70% of a maximum width of an inflatable section of the curtain bag, and thereby, a bending stiffness of the curtain bag being increased.

Advantageous Effects of Invention

In the curtain bag of the present invention, a portion of the bag is shaped so as to catch a bottom sill of a window at a time of inflation and deployment, the inner joining section of a region that contacts a section below the bottom sill of the window is shaped with a plurality of dots so as to catch the window easily, and a maximum thickness at a time of inflation is made 100 to 250 mm, and/or the curtain bag has a form inflatable substantially across an entire surface of the curtain bag, and thereby, a tensile force of the fabric being increased, and/or a length of the single inner joining section projected in a width direction is 2 to 70% of a maximum width of an inflatable section of the curtain bag, and thereby, a bending stiffness of the curtain bag being increased, whereby the present invention has the advantageous effect of suppressing ejection of an occupant out from a vehicle at a time of lateral collision and automobile rolls over thereafter.

Furthermore, the gas from the gas generator can be distributed to the inflation section in a short period of time, the curtain bag stably inflates more quickly without damage, without causing excessive stress concentration onto the joining sections, and the impact on an occupant can be substantially absorbed. Further, by reduction of the stress concentration, the fineness of the raw yarn can be more reduced, the density of the woven fabric can be more reduced, and in addition, the coating amount can be reduced. Thereby, reduction in weight and storability of the curtain bag can be expected. Further, the area of the section which protects the head of an occupant is increased, the number of man-hours, and the period of the design and tests of the curtain bag can be reduced, and the curtain bag also can easily respond to the change of the seating posture of an occupant.

DESCRIPTION OF EMBODIMENTS

Figure 1:
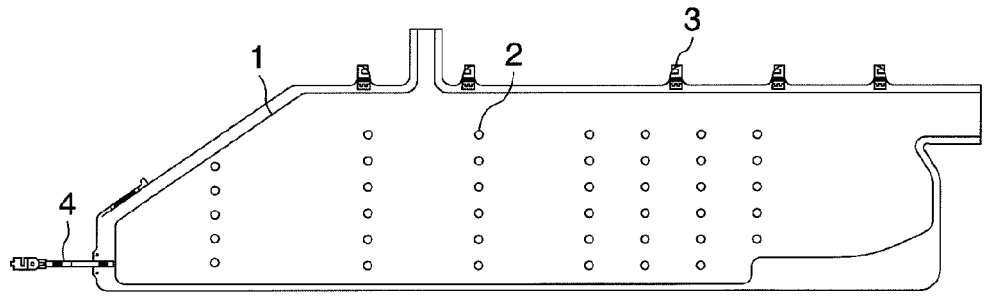
FIG. 1 is a view showing a first example of a curtain bag according to the present invention.

A best mode for carrying out the present invention will be described in detail.

In a curtain bag of the present invention, at least two pieces of fabric are joined to each other at least at a peripheral joining section provided at a peripheral edge, and an inner joining section provided at an inner side of the peripheral joining section, a portion of the curtain bag and/or the peripheral edge is shaped so as to catch a bottom sill of a window at a time of inflation and deployment, and the inner joining section of a region that contacts a section below the bottom sill of the window is shaped with a plurality of dots so as to catch the window easily, and the maximum thickness at the time of inflation is made 100 to 250 mm. And/or, in a curtain bag of the present invention, the curtain bag has a form inflatable substantially across an entire surface of the curtain bag, and thereby, a tensile force of the fabric being increased. And/or, in a curtain bag of the present invention, a length of the single inner joining section projected in a width direction is 2 to 70% of a maximum width of the inflatable section of the curtain bag, and thereby, a bending stiffness of the curtain bag being increased.

The fabric used for the curtain bag of the present invention is preferably woven fabric. While raw yarn is not especially limited, it is preferably synthetic long fiber of polyamide, polyester or the like. In case of using a pyro-type inflator using a solid gas forming agent, or a hybrid inflator which uses a high pressure gas and a solid gas forming agent in combination, Nylon 66 fibers are more preferable, since there is a fear of melting due to the high-temperature gas from the gas generator and a combustion residue.

While the fineness of the raw yarn is not especially limited, it is preferably 78 to 940 dTex, and is more preferably 235 to 475 dTex. If the fineness is 78 dTex or more, the raw yarn can endure a dynamic load by the gas spouting from a gas generator, and a thermal load by a high-temperature gas and a combustion residue etc. in the case of using the aforesaid pyro type inflator and hybrid type inflator. Further, if the fineness is 940 dTex or lower, the raw yarn can be satisfactory from the viewpoint of strength, and even when woven with high density, many crossover points of warp yarn and weft yarn are made, an aperture thus hardly being generated in the peripheral joining section and the inner joining sections due to the internal pressure at the time of operation. Thus, there is no fear of an outflow of the gas from these sections. Further, the finished woven fabric is thin and light, and storability of the curtain bag is improved.

Raw yarn may be directly used as the warp yarn at the time of weaving, since ordinary plain weave fabric is produced when the curtain bag is manufactured by a machine-sewing method. In some cases, the raw yarn may be preferably used after being subjected to oiling, waxing or sizing. In the case of the curtain bag being manufactured by an OPW method, the peripheral joining section and the inner joining sections are formed by interlacing the warp yarn and the weft yarn of the predetermined portions of two pieces of fabric with the two pieces fabric being simultaneously woven. Thus, the weave density of the peripheral joining section and the inner joining sections becomes doubled as compared with that of the inflation section, whereby the force on the warp yarn during weave is large. Thus, the yarn easily becomes fluffy and many weave defects occur, and breakage of the raw yarn occurs in some cases. Therefore, sizing is preferably performed.

The weave density can be properly selected depending on the fineness of the raw yarn to be used. For example, the weave density with the warp yarn and the weft yarn in total of 90 to 110/2.54 cm is preferable for the fineness of 470 dTex. And, approximately 125/2.54 cm is preferable for the fineness of 350 dTex, and approximately 145/2.54 cm is preferable for the fineness of 235 dTex. Such ranges of weave density make weaving easy and improve weaving performance and woven fabric quality. Further, the woven fabric can endure the dynamic load and the thermal load by the gas spouting from the gas generator.

In the case of a curtain bag, the curtain bag needs to be inflated as quickly as possible. Further, in the case of a rollover corresponding type curtain bag, a predetermined internal pressure needs to be kept for a fixed period of time. Thus, in order to prevent an outflow of the gas from the fabric itself, the peripheral joining section, and the inner joining sections, a coating processing which will be described later is preferably applied. In the above described weave density range, an appropriate amount of the coating agent penetrates to the inside of the woven fabric, and a continuous coating film is easily formed on the woven fabric surface, so that the air tightness is improved.

As for the weave density, it is not necessarily required that the numbers of the warp yarn s and weft yarns be the same. A difference in density may be given in consideration of the weave efficiency or the direction of the dynamic load by the spouting gas.

Figure 19:
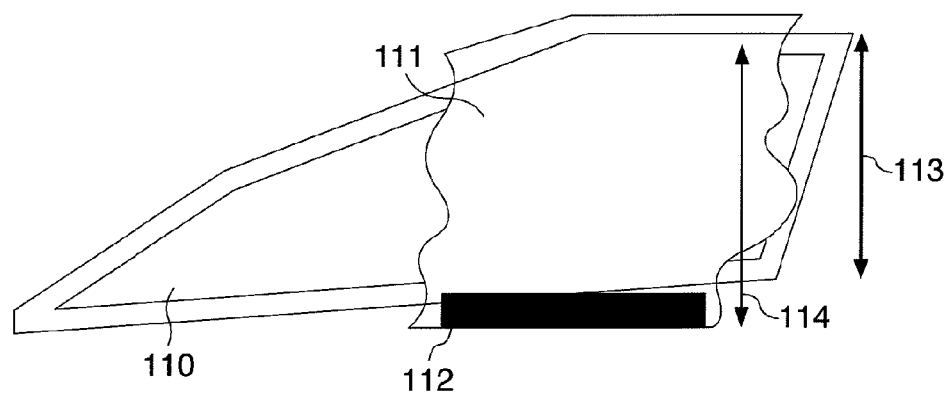
FIG. 19 is a schematic view showing a relation of a window of an automobile and the curtain bag which is deployed and inflated.

In a first embodiment of a curtain bag according to the present invention, a portion of the curtain bag and/or a peripheral edge is shaped so as to catch a bottom sill of a window at a time of inflation and deployment. FIG. 19 schematically shows a relation of the window of an automobile and a window sill 110, and a portion 111 of the curtain bag which is inflated and deployed. If a length 114 in a width direction of the curtain bag is larger than a maximum height 113 of the window, the window is completely covered with the curtain bag 111 at the time of deployment and inflation. In this case, a region (a portion) of the curtain bag which contacts a section below a bottom sill of the window is designated by 112. In order to make the occupant collide with the inflated curtain bag and to suppress the amount of ejection of an occupant out from the open window, it is important to shape a portion of the curtain bag and/or the peripheral edge so as to catch the bottom sill of the window at the time of inflation and deployment. Means for achieving the shape is not especially limited. However, for example, an area of the inflated curtain bag may be made larger than that of the window. In particular, the length 114 in the width direction of the curtain bag is preferably made long. The length 114 in the width direction of the curtain bag may be preferably 1.0 to 2.0 times, more preferably 1.1 to 1.5 times, and especially preferably 1.1 to 1.3 times as large as the maximum height 113 of the window. By shaping a portion of the curtain bag and/or the peripheral edge so as to catch the bottom sill of the window, load share is achieved due to the increase of the support points, and the amount of ejection out from a vehicle is suppressed. Partial increase of the length 114 in the width direction of the curtain bag is preferable, since the volumetric capacity at the time of inflation and deployment is not uselessly increased.

In the first embodiment of the curtain bag according to the present invention, it is important that the inner joining section of the region 112 that contacts the section below the bottom sill of the window of an automobile to which the curtain bag is mounted is shaped with a plurality of dots. By adopting the dot-shaped inner joining section, the shape of the curtain bag in the region at the time of inflation can be made to be flat and to have dot-shaped recesses corresponding to the shape of the inner joining section. Even if the length 114 in the width direction of the curtain bag is not made remarkably large, the curtain bag easily catches the section below the bottom sill of the window, whereby the amount of ejection out from the vehicle is suppressed.

Further, according to the curtain bag of the present invention, it is important that the maximum thickness at the time of inflation in the occupant protection region is 100 to 250 nm. The maximum thickness is preferably 130 to 200 mm, and especially preferably 140 to 180 mm. When the maximum thickness is in this range, the curtain bag has a sufficient stroke for absorbing kinetic energy of the occupant after the occupant contacts the inflated curtain bag. Furthermore, a second moment of area, which is proportional to the cube of the thickness, becomes large, whereby the curtain bag becomes hard to be bent. Thus, the amount of ejection out from the vehicle is suppressed. In addition, when the maximum thickness is in this range, the volumetric capacity of the curtain bag is prevented from increasing uselessly, and the curtain bag thus can be inflated and deployed by the time when the occupant contacts the curtain bag. In order to set the maximum thickness in this range, the shapes, the sizes and the disposition of the peripheral joining section and the inner joining section can be properly adjusted.

Figure 15:
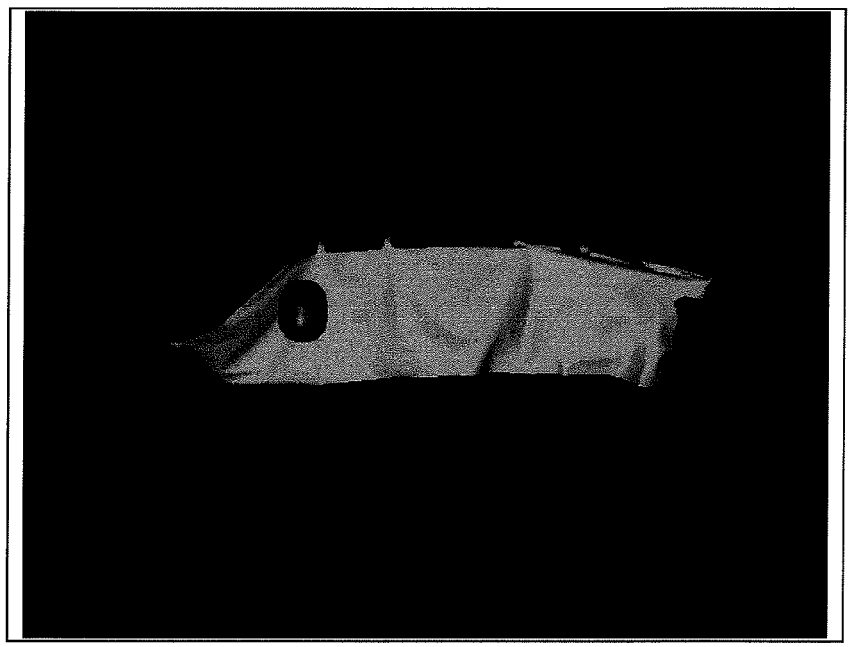
FIG. 15 is a schematic view of a curtain bag mounted to a test machine with only tabs and collided by an occupant head dummy after inflated and deployed.

Further, while the tabs and straps are usually used as vehicle body mounting jigs, it is preferable that only tabs are used. A strap is usually mounted at a front portion and/or a rear portion of the curtain bag, and has the function of preventing the curtain bag from being significantly away from the window at the time of inflation and deployment. Therefore, at the time of deployment and inflation, a force to pull the curtain bag in the longitudinal direction is generated in the strap. When the curtain bag is mounted at a top sill of the window or a ceiling section with only tabs, the force by the strap to pull the curtain bag in the longitudinal direction is not generated at the time of inflation and deployment. Thus, the movement in the width direction becomes difficult to be restrained, and the curtain bag thus easily catches the bottom sill of the window. Thereby, in some cases, load share is achieved due to the increase of the support points, and the amount of ejection out from a vehicle is suppressed. FIG. 15 shows a situation of a collision of an occupant head dummy after inflation and deployment in the case of a curtain bag without a strap. Since the front strap is not provided, the curtain bag is prevented from being pulled forward at the time of inflation and deployment, and the following collision of an occupant. Thus, the front portion of the curtain bag is slightly bent downward in a downturned shape like a Japanese hiragana of "he". Thereby, the front portion of the curtain bag easily catches the bottom sill of the window even with the same width of the curtain bag.

Especially as shown in FIG. 1, it is preferable that a plurality of dot-shaped inner joining sections are provided at the inner side of the peripheral joining section independently from the peripheral joining section and independently from one another. When the inner joining sections are shaped in the form of dots and are independently from one another, the curtain bag is difficult to bend at a specific spot at the time of inflation and deployment and/or at the time of the following collision of an occupant to the curtain bag, without increasing the length 114 in the width direction of the curtain bag. Thereby, the curtain bag catches the bottom sill of the window at the time of inflation and deployment, load share is achieved due to the increase of the support points, and the amount of ejection out from a vehicle is suppressed. Further, even if the length 114 in the width direction of the curtain bag is made long and the inflatable area is increased, the gas from the gas generator can be distributed to the inflation sections in a short period of time, and the curtain bag can be more quickly inflated and deployed stably without a damage without causing excessive stress concentration to the joining portions. Further, even if the inflatable area is increased, the inner joining sections shaped with a plurality of dots can be properly provided. Thereby, the thickness at the time of inflation and deployment can be prevented from increasing more than necessary and the thickness of the non-occupant protection region can be especially suppressed. Thus, even when the gap between the occupant and the window sill is small, the curtain bag can be inflated and deployed between both of them.

Figure 17:
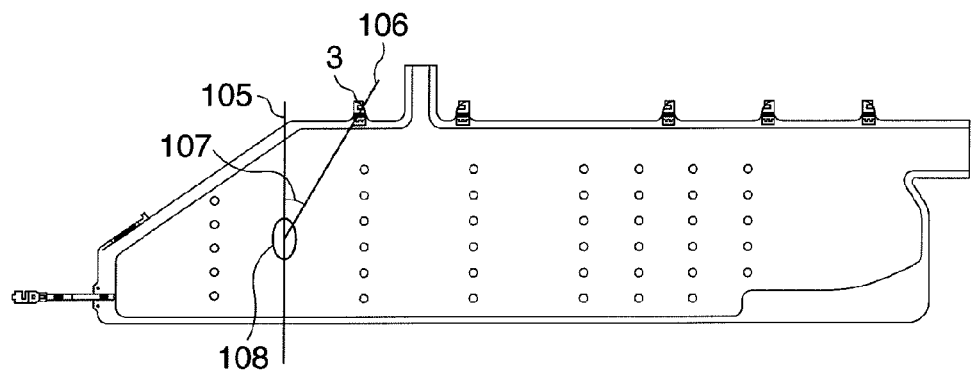
FIG. 17 is a view showing an angle formed by a straight line connecting a mounting position of the tab and an occupant collision assumed position, and a straight line in the width direction which passes through the occupant collision assumed position.

Especially as shown in FIG. 17, it is preferable to be provided with at least one tab which is in the position where the angle formed by the straight line connecting the mounting position of the tab and the occupant collision assumed position, and the straight line in the width direction which passes through the occupant collision assumed position is 0 to 30 degrees or less, in particular 0 to 20 degrees or less. If the tab is mounted in this range, the tub can effectively support the load which is generated to deform the curtain bag when the head of an occupant collides with the curtain bag. Thus, the amount of ejection out from the vehicle is suppressed.

A second embodiment of a curtain bag according to the present invention is shaped so as to increase the tensile force of fabric by having a form inflatable substantially across an entire surface of the curtain bag. The maximum thickness at the time of inflation is made to be 100 to 250 mm. Being inflatable substantially across the entire surface means that the area of the inflatable section defined by the peripheral joining section with respect to the curtain bag area is 80% or more, is preferably 85% or more, and is especially preferably 90% or more. If the curtain bag is inflatable substantially across the entire surface, the fabric tensile force of the curtain bag is improved by the internal pressure after being inflated, and the inflated form is easily kept at the time of collision of an occupant. Thus, the effect of suppressing the ejection amount of the occupant out from the vehicle is enhanced. Further, the maximum thickness of the curtain bag at the time of inflation in the occupant protection region is preferably 100 to 250 mm. The maximum thickness is preferably 130 to 200 mm, and especially preferably 140 to 180 mm. When the maximum thickness is in this range, the curtain bag has a sufficient stroke for absorbing kinetic energy of the occupant after the occupant contacts the inflated curtain bag. Furthermore, a second moment of area, which is proportional to the cube of the thickness, becomes large, whereby the curtain bag becomes hard to be bent. Thus, the amount of ejection out from the vehicle is suppressed. In addition, when the maximum thickness is in this range, the volumetric capacity of the curtain bag is prevented from increasing uselessly, and the curtain bag thus can be inflated and deployed by the time when the occupant contacts the curtain bag. In order to set the maximum thickness in this range, the shapes, the sizes and the disposition of the peripheral joining section and the inner joining section can be properly adjusted.

Especially as shown in FIG. 1, it is preferable that a plurality of dot-shaped inner joining sections are provided at the inner side of the peripheral joining section independently from the peripheral joining section and independently from one another. With the present form, the curtain bag is inflatable substantially across the entire surface. Thus, even if the inflatable area is increased, the gas from the gas generator can be distributed to the inflation section in a short period of time, and the curtain bag can be stably inflated and deployed more quickly without damage without causing excessive stress concentration to the joining sections. Further, even if the inflatable area is increased, the inner joining sections shaped with a plurality of dots can be properly provided. Thereby, the thickness at the time of inflation and deployment can be prevented from increasing more than necessary and the thickness of the non-occupant protection region can be especially suppressed. Thus, even when a gap between the occupant and the window sill is small, the curtain bag can be inflated and deployed between both of them.

Especially as shown in FIG. 17, it is preferable to be provided with at least one tab which is in the position where the angle formed by the straight line connecting the mounting position of the tab and the occupant collision assumed position, and the straight line in the width direction which passes through the occupant collision assumed position is 0 to 30 degrees or less, in particular 0 to 20 degrees or less. If the tab is mounted in this range, the tub can effectively support the load which is generated to deform the curtain bag when the head of an occupant collides with the curtain bag. Thus, the amount of ejection out from the vehicle is suppressed.

Figure 16:
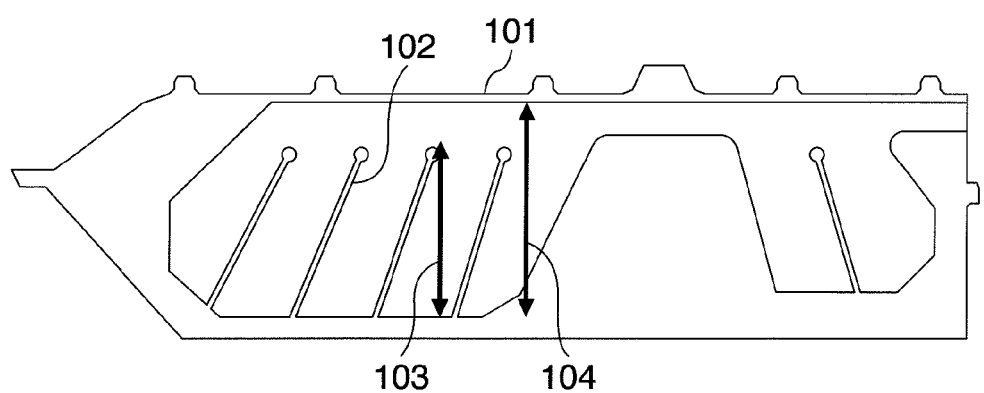
FIG. 16 is a view showing a length of the inner joining section projected in a width direction.

In a third embodiment of a curtain bag according to the present invention, the length a single inner joining section projected in the width direction is 2 to 70% of the maximum width of the inflatable section of the curtain bag, whereby a bending stiffness of the curtain bag being increased. The maximum thickness at the time of inflation is made to be 100 to 250 mm The maximum width of the inflatable section is 2 to 70%, is preferably 2 to 65%, and is especially preferably 2 to 60%. If the length of the single inner joining section projected in the width direction is in this range, the curtain bag is hard to be bent in the inner joining section, and the bending stiffness is improved. The length of the single inner joining section projected in the width direction means the length of a line segment 103 shown in FIG. 16, and it is important that the length is 2 to 70% with respect to the width 104 of the inflatable section of the curtain bag. Further, in the curtain bag, the maximum thickness at the time of inflation in the occupant protection region is preferably 100 to 250 mm. The maximum thickness is preferably 130 to 200 mm, and is especially preferably 140 to 180 mm. When the maximum thickness is in this range, the curtain bag has a sufficient stroke for absorbing kinetic energy of the occupant after the occupant contacts the inflated curtain bag. Furthermore, a second moment of area, which is proportional to the cube of the thickness, becomes large, whereby the curtain bag becomes hard to be bent. Thus, the amount of ejection out from the vehicle is suppressed. In addition, when the maximum thickness is in this range, the volumetric capacity of the curtain bag is prevented from increasing uselessly, and the curtain bag thus can be inflated and deployed by the time when the occupant contacts the curtain bag. In order to set the maximum thickness in this range, the shapes, the sizes and the disposition of the peripheral joining section and the inner joining section can be properly adjusted.

Figure 3:
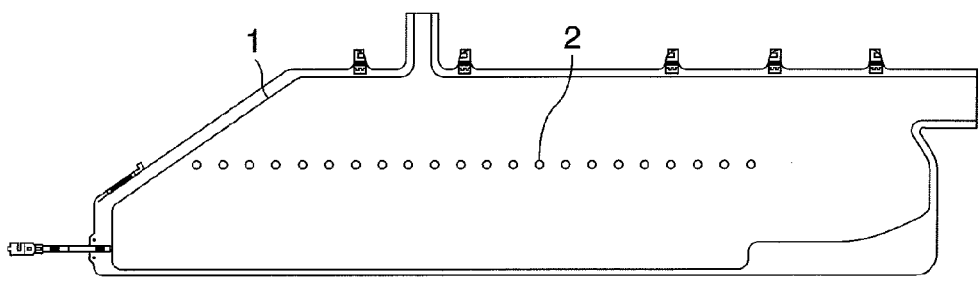
FIG. 3 is a view showing a third example of the curtain bag according to the present invention.

Further, as shown in FIG. 3, in at least one of the inflatable sections, the length in the longitudinal direction is 60% or more, especially preferably 70% or more of the length in the longitudinal direction of the curtain bag. The inflatable section especially preferably has a form which is continuous in the longitudinal direction without being cut at the inner joining section. With the form, the inflatable section is sufficiently long in the longitudinal direction, is not cut at the inner joining section. Therefore, the curtain bag is hard to be bent in the longitudinal direction, so that the bending stiffness can be increased.

Especially as shown in FIG. 1, it is preferable that a plurality of dot-shaped inner joining sections are provided at the inner side of the peripheral joining section independently from the peripheral joining section and independently from one another. When the inner joining sections are in the forms of dots and are independent from one another, the curtain bag is difficult to be bent at a specific spot at the time of inflation and deployment and/or at the time of the following collision of an occupant to the curtain bag, and the bending stiffness is improved. Further, the portions between a plurality of dot-shaped inner joining sections are inflatable, and thus have a thickness, so that the second area moment is increased. Therefore, bending deformation of the curtain bag hardly occurs at the time of collision of the occupant, and the bending stiffness is improved.

Especially as shown in FIG. 17, it is preferable to be provided with at least one tab which is in the position where the angle formed by the straight line connecting the mounting position of the tab and the occupant collision assumed position, and the straight line in the width direction which passes through the occupant collision assumed position is 0 to 30 degrees or less, in particular 0 to 20 degrees or less. If the tab is mounted in this range, the tub can effectively support the load which is generated to deform the curtain bag when the head of an occupant collides with the curtain bag. Thus, the amount of ejection out from the vehicle is suppressed.

Figure 2:
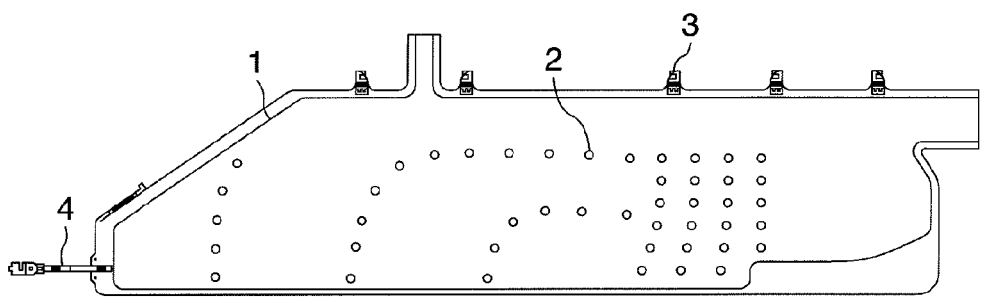
FIG. 2 is a view showing a second example of the curtain bag according to the present invention.

The forms which suppresses the amount of ejection of an occupant out from a vehicle, that is, the form in which a portion of the curtain bag and/or the peripheral edge catches the bottom sill of the window at the time of inflation and deployment is given, the inner joining section which contacts the section below the bottom sill of the window are shaped with a plurality of dots, and/or the form inflatable substantially across the entire surface of the curtain bag, and whereby a tensile force of the fabric being increased, and/or the form in which a length of the single inner joining section projected in a width direction is 2% to 70% of a maximum width of an inflatable section of the curtain bag, and thereby, a bending stiffness of the curtain bag being increased, may be individually used, or two or three of the forms may be used in combination. In particular, the combination of the form inflatable substantially across the entire surface of the curtain bag, and whereby a tensile force of the fabric being increased, and the form in which a length of the single joining section projected in the width direction is 2 to 70% of the maximum width of the inflatable section of the curtain bag, and thereby, a bending stiffness of the curtain bag being increased, is preferable, since it can effectively suppresses the amount of ejection of an occupant out from a vehicle with making the area of the curtain bag small. The specific form is illustrated in FIG. 2. However, the form is not limited to this form.

According to the present invention, the plurality of dot-shaped inner joining sections are preferably provided substantially across the entire surface of the inflatable region. Being provided substantially across the entire surface of the inflatable region means that within the distance of 50% of the length in the longitudinal direction of the curtain bag from the dot-shaped inner joining section, at least another dot-shaped inner joining section is provided, and that only the dot-shaped inner joining section is provided as the inner joining section. It is preferable that at least another doted inner joining section is provided in the distance of 40%, especially preferably 30% of the length in the longitudinal direction of the curtain bag from the dot-shaped inner joining section. With the present form, the gas from the gas generator can be distributed to the inflation sections in a short period of time, and the curtain bag can be stably inflated and deployed more quickly without damage, without causing excessive stress concentration to the joining sections. In addition, due to increase of the fabric tensile force of the bag and increase of the bending stiffness, the amount of ejection of an occupant out from a vehicle can be effectively suppressed. Further, a plurality of dot-shaped inner joining sections are properly provided across the entire surface of the inflatable region, whereby the thickness at the time of inflation and deployment can be prevented from increasing more than necessary and the thickness of the non-occupant protection region can be especially suppressed. Thus, even when the gap between the occupant and the window sill is small, the curtain bag can be inflated and deployed between both of them.

According to the present invention, the distance between the plurality of dot-shaped inner joining sections in the occupant protection region is preferably longer than in the non-occupant protection region. The occupant protection region is the region of the curtain bag with which the head of an occupant is likely to contact at the time of a lateral collision, and is the region which can lower the injury applied to the head by becoming in contact with the curtain bag to the specified value or less. For the specified value of injury, a well-known numeric value which is set by the safety standards or the like is used. For example, the deceleration of a head of less than 100 G is used. The non-occupant protection region is the region that is the inflation region of the curtain bag from which the occupant protection region is excluded. It is preferable that the distance between the dot-shaped inner joining sections in the occupant protection region is longer than in the non-occupant protection region, since increase of the volumetric capacity at the time of inflation of the entire curtain bag can be suppressed while a sufficient thickness is ensured to suppress the amount of ejection out from a vehicle at the time of inflation of the occupant protection region.

According to the present invention, the distance between the plurality of dot-shaped inner joining sections can be properly selected in accordance with the selected form of the curtain bag. More specifically, when the form in which a portion of the curtain bag and/or the outer edge catches the bottom sill of the window at the time of inflation and deployment is selected, it is preferable that the distance between the dot-shaped inner joining sections is selected to be large in the longitudinal direction compared with the width direction, since the bending stiffness in the width direction of the curtain bag is improved. Further, in the case of the form which increases the bending stiffness in the longitudinal direction of the curtain bag, it is preferable that the distance between the dot-shaped inner joining sections can be selected to be small in the longitudinal direction compared with the width direction. The form may be adopted, in which the distance between the inner joining sections is large in the longitudinal direction compared with the width direction in some regions of the curtain bag, and is small in the other portions.

According to the present invention, the form in which the dot-shaped inner joining sections are provided substantially continuously in the longitudinal direction is preferable. Being provided substantially continuously in the longitudinal direction means being provided along the straight line substantially parallel with the upper end or the lower end in the width direction of the curtain bag, and the distance between the dot-shaped inner joining sections along the straight line being 2 to 50% of the length in the longitudinal direction of the curtain bag. The distance between the dot-shaped inner joining sections along the straight line is preferably 5 to 40%, especially preferably 5 to 30% of the length in the longitudinal direction of the curtain bag. It is preferable that the present form is adopted, since the bending stiffness in the longitudinal direction of the bag increases. The specific form is illustrated in FIG. 3. However, the form is not limited to this form.

According to the present invention, it is preferable that as for the number of 15 or more to 160 or less of the dot-shaped inner joining sections are provided. When the number of the inner joining sections is smaller than 15, the area of each of the inner joining sections needs to be made extremely large to make the thickness at the time of inflation of the curtain bag suitable. Thus, appropriate inflation sections are difficult to obtain, and reduction of fabric tensile force and reduction of bending stiffness are caused. Meanwhile, when the number of inner joining sections exceeds 160, the area of each of the inner joining sections needs to be made extremely small in order to make the thickness at the time of inflation of the curtain bag suitable. Thus, the fear of impairing appropriate diffusion of the gas arises.

According to the present invention, the dot-shaped inner joining section preferably has an area of 0.7 $cm^2$/each to 20 $cm^2$/each, and more preferably has an area of 2 $cm^2$/each to 15 $cm^2$/each. If the area of each of the dot-shaped inner joining sections is 0.7 $cm^2$/each or more, the inflation section becomes moderate, the force to the section is small, and breakage hardly occurs. Further, if the area of each of the dot-shaped inner joining sections is 13 $cm^2$/each or less, the inflation section also becomes moderate, a predetermined internal pressure is obtained, and the thickness at the time of the inflation of the curtain bag also becomes moderate.

Figure 4:
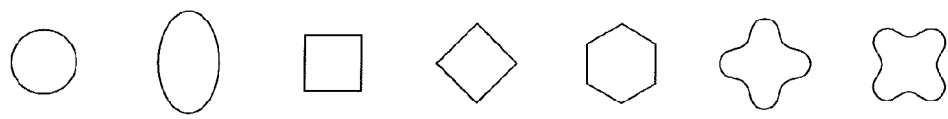
FIG. 4 is a view showing shape examples of an inner joining section.

According to the present invention, the dot-shaped inner joining section is the non-inflation section formed by integrating two pieces of fabric by interlacing, sewing, or bonding of the weaving yarns constituting the two pieces of fabric, and includes both the spot where the top and bottom pieces of fabric are integrated on the entire surface of the non-inflation section and the spot where the top and bottom pieces of fabric are integrated by surrounding the non-inflation section and the insides thereof are not integrated. The dot-shaped inner joining section can be formed as the line segment of the straight line or the curved line. Also, it can be formed into the shapes as shown in FIG. 4. The dot-shaped inner joining section can be formed into, for example, a circle, an ellipse, a quadrangle, a rhombus, a polygon, or the shapes of these shapes partially deformed. A circle and an ellipse are preferable since stress hardly concentrates on the dot-shaped inner joining section. According to the present invention, the dot-shaped inner joining section may be formed by integrating the entire surfaces of these shapes by interlacing of weaving yarns or sewing. Also, the dot-shaped inner joining section may be formed as the non-inflation section which has only the peripheral edges of these shapes integrated by interlace of weaving yarns or sewing, and the insides of which is not integrated, but is not inflated by a gas.

All the shapes and the areas of the dot-shaped inner joining sections may be the same in the curtain bag. Also, the dot-shaped inner joining sections in different shapes with different areas may be combined with one another. The shapes and the areas of the dot-shaped inner joining sections are preferably set in consideration of the size and the shape of the curtain bag, the output and the position of the gas generator to be used and the like.

Figure 5:
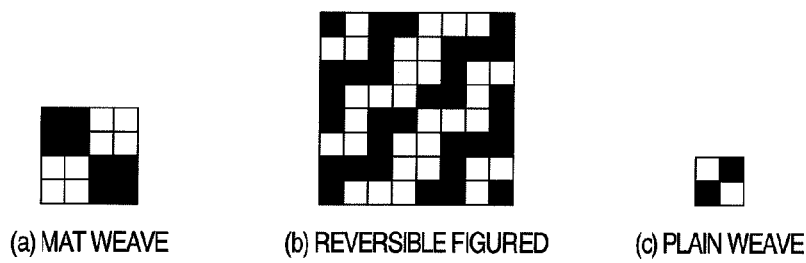
FIG. 5 is a view showing examples of weave structures in the vicinity of a boundary between the inner joining section and an inflation section.
Figure 6:
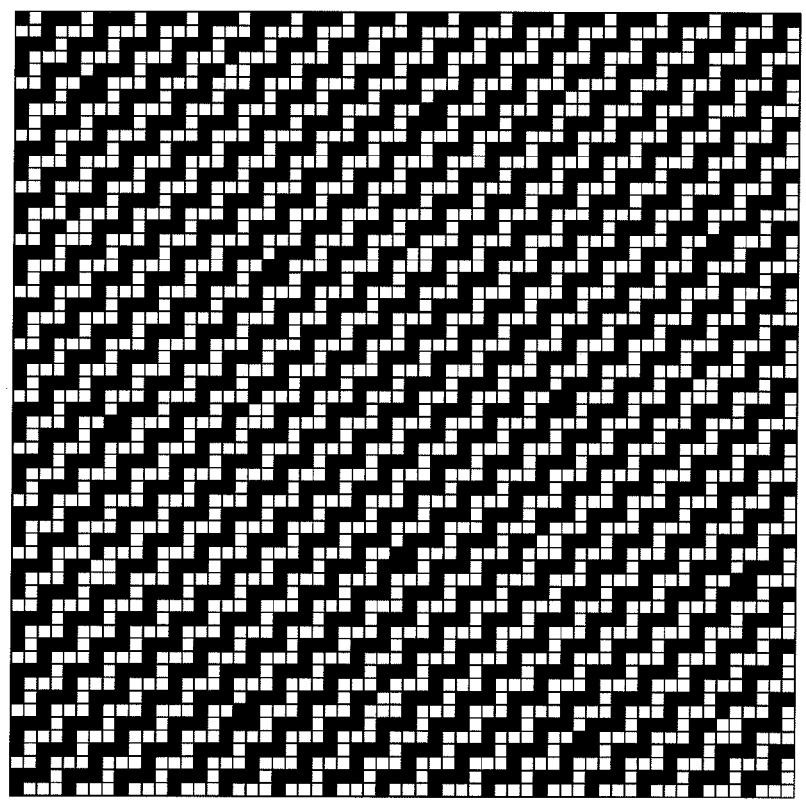
FIG. 6 is a view showing an example of a weave structure of an inner side from the vicinity of the boundary between the inner joining section and the inflation section.

When the joining sections are formed by OPW, the weave structure of the joining section in the vicinity of the boundary with the inflation section is not especially limited. However, various weave structures such as (a) mat weave, (b) reversible figured and (c) plain weave as shown in, for example, FIG. 5 may be combined, and suitable repetition of these structures may be performed. Further, while the weave structure of the sections other than the vicinity of the boundary between the joining section and the inflation section is not especially limited. Partial node connection weave as shown in, for example, FIG. 6 is preferable from the viewpoint of reducing the crossover points.

A plain weave structure is usually used as the weave structure of the inflation section except for the peripheral joining section, the inner joining sections, and the vicinity of the boundaries between these joining sections and the inflation section.

Figure 7:
FIG. 7 is a view showing an example of a weave structure called check-pattern weave or rip stop.

In some cases, a window glass is broken at the time of a lateral collision of an automobile with another automobile or an obstacle, and the broken glass pieces gives a damage to a curtain bag, and the curtain bag is torn wide open. In order to reduce the degree of the damage as much as possible, the weave structure of the inflation section except for the peripheral joining section, inner joining sections, and the vicinity of the boundaries between these joining sections and the inflation section is preferably made into the weave structure which is a so-called check-pattern weave or rip stop, which is woven with several yarns made parallel together at every fixed number of warp yarns and weft yarns as shown in FIG. 7 as an example, instead of a simple plain structure.

The number of yarns which are made parallel together is preferably about two to three. With the larger number of yarns than this, the gap between the yarns becomes large, and the surface coating effect of the coating agent decreases. Further, the space of the yarns which are made parallel together is 5 mm to 30 mm, and more preferably, 10 mm to 20 mm. With the space not larger than this, the gap between the yarns becomes large, and the surface coating effect of the coating agent decreases. If the space between the yarns made parallel together becomes larger than this, the effect of reducing the damage to the curtain bag by glass pieces is reduced.

When the joining sections are formed by a machine-sewing method, the two pieces of fabric can be sewn up by using an ordinary sewing machine, or a so-called pattern sewing machine which automatically sews with the form inputted into the sewing machine. At this time, when air tightness is especially required, a sealing agent is interposed between the two pieces of fabric and sewn up, whereby an outflow of a gas from the seams can be prevented.

When the joining sections are formed by a bonding method, an adhesive is coated between the two pieces of fabric, and the two pieces of fabric are sandwiched between two rolls as a pressing machine and a rolling machine having heating mechanisms, whereby a compression force is applied to the portion coated with the adhesive, and the two pieces of fabric at this portion can be joined. The kind of the adhesive at this time is not restrictive, but when an outflow of a gas is to be prevented, a silicone adhesive is used.

In the case of OPW, raw yarn which is subjected to sizing is usually used as warp yarn and weaved, and coating processing is preferably applied to improve air tightness of the bag. Though not especially limited, scouring is preferably performed by a jigger scouring machine or a continuous scouring machine having a plurality of scouring boxes, a water washing box and the like, for the purpose of removing oil agents and the sizing agent which adhere to the raw yarn prior to coating so as not to inhibit adhesiveness of the coating agent and fabric. After scouring, the fabric is dried by a dry can or the like. The fabric is sometimes subjected to the next coating process directly after drying, but in order to control the size and the weave density, heat setting is preferably performed successively after scouring and drying in order to control the size and weave density.

Meanwhile, in the machine-sewn curtain bag, scouring is not always needed when the warp yarn is weaved without being subjected to sizing, but when sizing yarn or the like is used, scouring needs to be performed, and in this case, drying or heat setting after drying is preferably performed as in the OPW method, though not especially limited when the present invention is carried out.

Though the coating agent and the coating method are not especially limited when the present invention is carried out, as the coating agent, silicon agents are generally used, and coating is usually performed with knife coaters. The coating agent coating amount differs depending on the characteristics of the silicon resin to be used, depending on whether the manufacturing method is an OPW method or a machine-sewing method, and depending on whether the bag is the bag for use on the supposition of only a time of lateral collision or the bag on the supposition of roll-over of an automobile after a lateral collision.

The coating amount of the coating agent is not especially limited. However, 20 to 50 g/m$^2$ is preferable in the curtain bags which are a machine-sewn curtain bag and a curtain bag of an OPW method, and which are not on the supposition of roll-over of automobiles. And, 50 to 150 g/m$^2$ is preferable in the curtain bags which are bags of an OPW method and are on the supposition of occupant protection at the time of roll-over of automobiles.

In the OPW method, after coating, the fabric is cut into predetermined sizes and shapes by a laser cutter, accessories such as straps for fixing the curtain bag being sewn thereon, reinforcement or the like of the mounting portions to a vehicle body being performed, and a product (curtain bag) being produced.

In a machine-sewing method, after the coated fabric is cut into predetermined shapes and sizes, two pieces of fabric are superimposed on each other, and are sewn at predetermined positions. As the above description, when air tightness is especially required, a sealing agent such as a silicon sheet is sandwiched between the two pieces of coated fabric in the vicinity of the seams, and the two pieces of coated fabric are sewn.

EXAMPLES

Next, the present invention will be described specifically based on examples and reference examples.

(1) Deployment Test

Test samples were each mounted with a cold gas type inflator manufactured by Autoliv Inc. (maximum pressure 220 kPa in 23.8 l tank pressure test) and a curtain bag internal pressure measuring sensor, a curtain bag deployment test was then performed. High-speed photographing of the deployment situation of the curtain bag and measurement of the change in the curtain bag internal pressure were performed. The deployment speed shown in Table 1 is the time at which the curtain bag internal pressure reaches 60 kPa.

(2) Impactor Test

Test samples were each mounted with a curtain bag internal pressure measuring sensor, and were deployed to 40 kPa with compressed air while the internal pressure was checked. At this time, the maximum thicknesses of the inflation sections were measured with a metal straightedge. Thereafter, an impactor test was carried out by a method in accordance with the test guidelines (Docket No. NHTSA-2006-26467) of NHTSA (National Highway Traffic Safety Administration), and the amounts of ejection out from a vehicle were obtained.

Example 1

Figure 8:
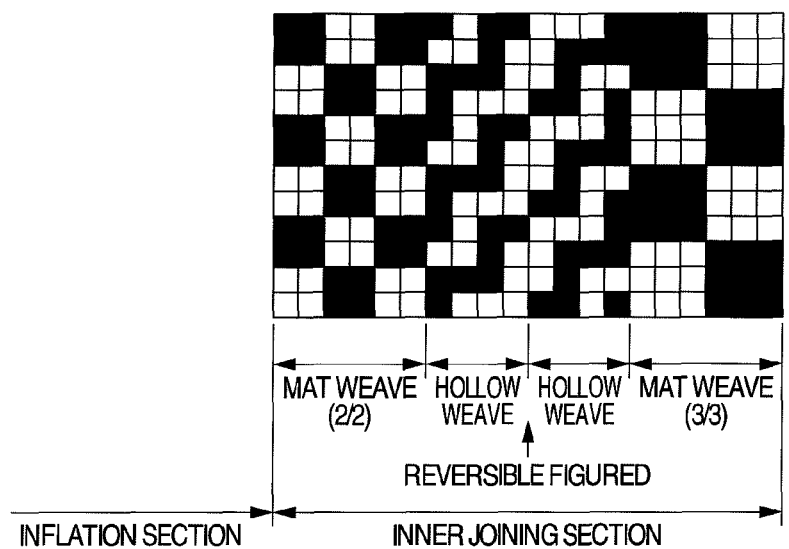
FIG. 8 is a view showing a weave structure of the vicinity of the boundary between the inner joining section and the inflation section, which is used in an example.
Figure 9:
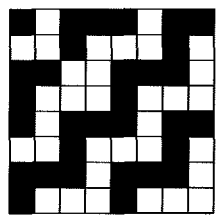
FIG. 9 is a view showing a weave structure of an inner side from the vicinity of the boundary between the inner joining section and the inflation section, which is used in an example.

Yarn with the number of single yarns of 144 of nylon 66 raw yarn with fineness of 470 dTex made by Polyamide High Performance Inc. was used, and was subjected to sizing with a sizing agent with polyacrylic acid as a main component for warp yarn, and woven fabric in the form shown in FIG. 1 was woven by an air-jet loom (made by Dornier Inc.) loaded with a Jacquard machine (made by Staubli KK) so that the finished weave density was 57 warp yarns/2.54 cm, 48 weft yarns/2.54 cm. The number of dot-shaped inner joining sections each with an area of 3 cm$^2$ was 40. The inflation section had a plane weave structure. The weave structure of each of the inner joining sections in the vicinity of the boundary sections with the inflation section was the structure shown in FIG. 8. The weave structure at the inner side from the vicinity of the boundary section with the inflation section in each of the inner joining sections was the structure shown in FIG. 9.

The fabric after woven was scoured by a continuous scouring machine. After drying, heat setting was performed at 180° C. for one minute by a pin stenter. The fabric after the scouring and heat setting was coated with a silicon resin (DC3730 manufactured by Dow Corning Toray Silicone Co., Ltd.) by 85 g/m$^2$ per one side by a knife coating method, and was heated at 180° C. for 3 minutes in a heating furnace. Thereafter, the fabric was coated with a silicon smoothing agent (DC3715 manufactured by Dow Corning Toray Silicone Co., Ltd.) by 10 g/m$^2$ per one side as a surface smoothing agent by a gravure coater, and was dried.

Figure 10:
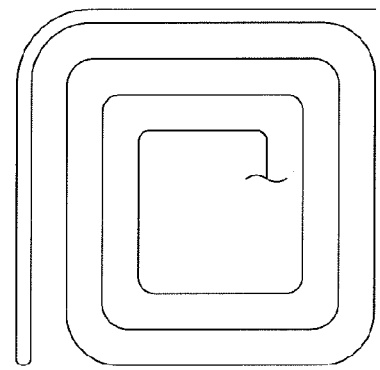
FIG. 10 is a view showing a folded state of a bag which is used in an example.

The coated product was cut into predetermined shapes by a laser cutter (manufactured by Lectra Corp.), reinforcing sewing for the mounting section to an automobile body and sewing of the front strap being performed, and a curtain bag product being dried. Furthermore, the product was folded by the method shown in FIG. 10, and was temporarily fastened with a tape, whereby a test sample was made. For the sample, the deployment test and impactor test were carried out. The sample was mounted to the test machine by tabs and the front strap.

The test results are shown in Table 1.

Example 2

By the same method as in example 1, the curtain bag in the form shown in FIG. 2 with the number of dot-shaped inner joining sections being 45 each with an area of 3 cm$^2$ was produced. And then, the deployment test and impactor test were carried out.

The test results are shown in Table 1.

Example 3

By the same method as in example 1, the curtain bag in the form shown in FIG. 3 with the number of dot-shaped inner joining sections being 22 each with an area of 3 cm$^2$ was produced. And then, the deployment test and impactor test were carried out.

The test results are shown in Table 1.

Example 4

Figure 11:
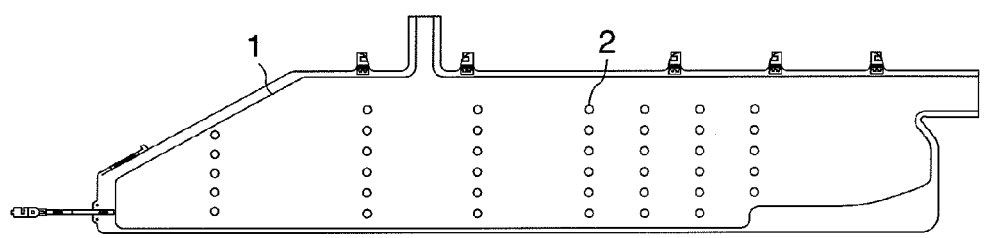
FIG. 11 is a schematic view of a curtain bag which is used in an example.

By the same method as in example 1, the curtain bag in the form shown in FIG. 11 with the number of dot-shaped inner joining sections being 40 each with an area of 3 cm$^2$ was produced. And then, the deployment test and impactor test were carried out. The form of the present example is the same as that in example 1, but the length in the width direction of the curtain bag was reduced by 20%.

The test results are shown in Table 1.

Example 5

By the same method as in example 1 except that a front strap is not sewn, the curtain bag shown in FIG. 2 was produced. And then, the deployment test and impactor test were carried out. Both tests were carried out without performing mounting by a front strap.

The test results are shown in Table 1.

Example 6

The curtain bag in the form shown in FIG. 17 was produced similarly to example 4 except that a tab is added to a position where the angle of 107 is 0 degrees. And then, the deployment test and impactor test were carried out.

The test results are shown in Table 1.

Comparative Example 1

Figure 12:
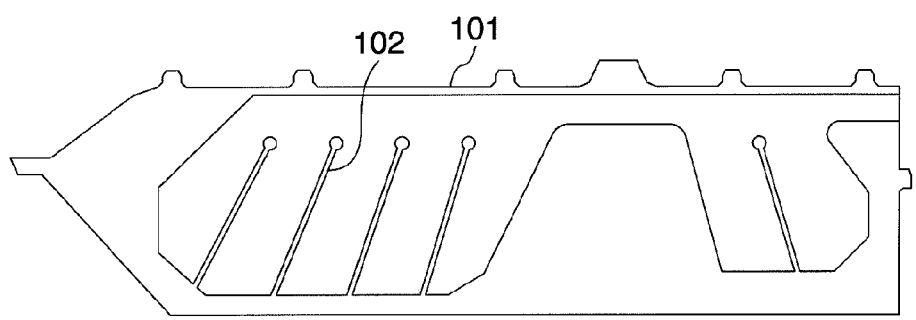
FIG. 12 is a schematic view of a curtain bag which is used in a comparative example.
Figure 13:
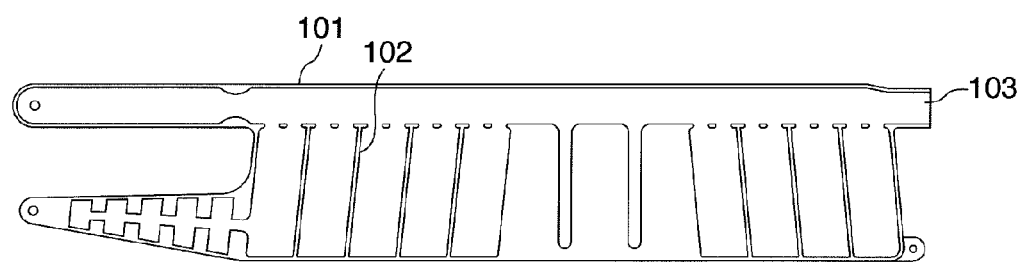
FIG. 13 is a schematic view of a conventional curtain bag described in the description of U.S. Pat. No. 6,010,149.
Figure 14:
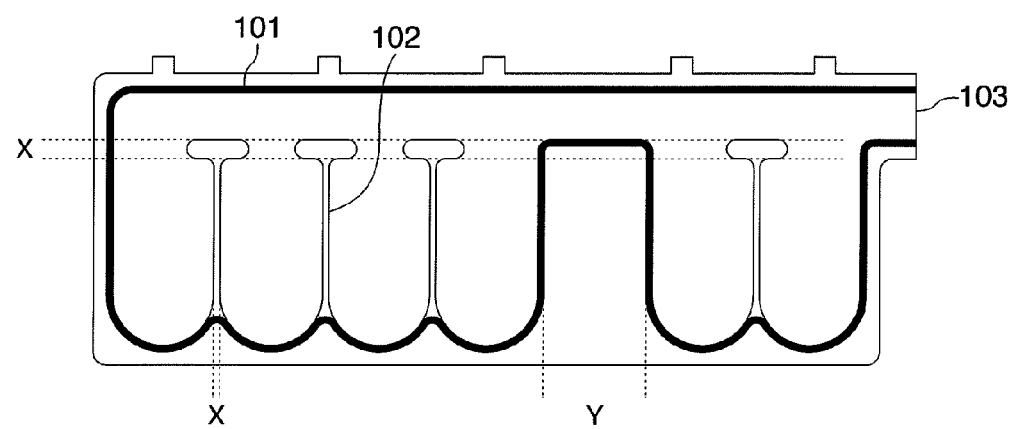
FIG. 14 is a schematic view of another conventional curtain bag.

The bag in the form shown in FIG. 12 in which five inner joining sections are connected to the peripheral joining section, which is the conventional product, was produced by the same method as in example 1. And then, the deployment test and impactor test were carried out. The present form is not the form inflatable substantially across the entire surface, and is the form in which the length of the inner joining section projected in the width direction is long, and the bending stiffness in the longitudinal direction is low.

The test results are shown in Table 1.

Comparative example 2

Figure 18:
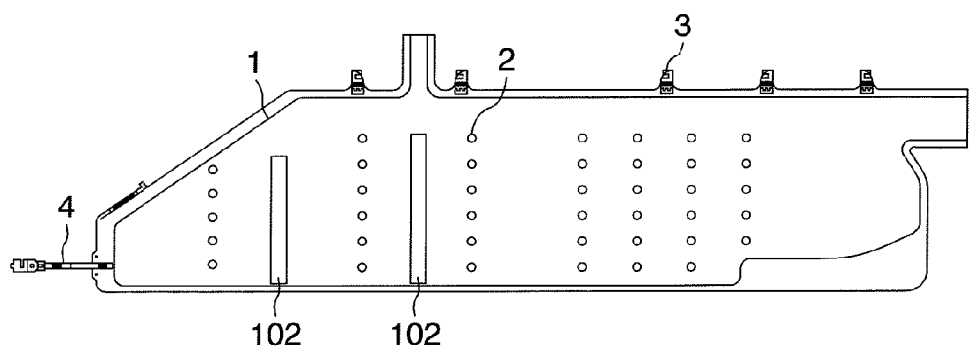
FIG. 18 is a schematic view of a curtain bag which is used in a comparative example.

The bag in the form shown in FIG. 18 was produced by the same method as in example 1. And then, the deployment test and impactor test were carried out. The present form has the inner joining sections added to the occupant protection region in the form of example 1. Thereby, the maximum thickness at the time of inflation was made less than 100 mm.

The test results are shown in Table 1.

INDUSTRIAL APPLICABILITY

The present invention is effective for the device which protects the occupant of an automobile at the time of a lateral collision of the automobile. The present invention is especially effective for the device which suppresses the amount of ejection of an occupant out from a vehicle and ensures safety.

REFERENCE SIGNS LIST 1 peripheral joining section
2 inner joining section
3 tab
4 strap
101 peripheral joining section of the conventional curtain bag
102 inner joining section of the conventional curtain bag
103 line segment showing the length of the inner joining section projected in the width direction
104 width of then inflatable section
105 straight line in the width direction passing through the occupant collision assumed position
106 straight line connecting the mounting position of the tab and the occupant collision assumed position
107 angle formed by the two straight lines 105 and 106
108 occupant collision assumed position
110 window and the window sill of an automobile
111 curtain bag inflated and deployed (one part)
112 region that contacts a section below the bottom sill of the window of an automobile in the curtain bag inflated and deployed
113 maximum height of a window
114 length in the width direction of the curtain bag

TABLE 1

|  | Bag Form | Bag Damage | Deployment Speed (msec) | Thickness (mm) | Amount of Ejection our from Vehicle (mm) | Remark |
| --- | --- | --- | --- | --- | --- | --- |
| Example 1 | FIG. 1 | None | 20 | 180 | 90 |  |
| Example 2 | FIG. 2 | None | 22 | 170 | 100 |  |
| Example 3 | FIG. 3 | None | 25 | 130 | 150 |  |
| Example 4 | FIG. 11 | None | 18 | 160 | 120 |  |
| Example 5 | FIG. 2 | None | 22 | 170 | 90 | Without Front Strap |
| Example 6 | FIG. 17 | None | 18 | 160 | 80 | Tab Added |
| Comparative Example 1 | FIG. 12 | None | 30 | 110 | 250 |  |
| Comparative Example 2 | FIG. 18 | None | 29 | 85 | 210 |  |

As shown in Table 1, in the curtain bag based on the present invention, the deployment speed is significantly improved as compared with the conventional curtain bag. Further, it is clear that adopting the specific form, in particular, shaping the inner joining section into a dot shape is effective to achieve the amount of ejection of an occupant out from a vehicle obtained as a result of the impactor test within the standard value of 200 mm defined by the guidelines of the aforementioned NHTSA. Further, it is clear that even though the area of the curtain bag is made small as compared with the conventional curtain bag, the aforementioned standard value can be achieved, which is effective in storability of the curtain bag.

The invention claimed is:

1. A curtain bag in which at least two pieces of fabric are joined to each other at least at a peripheral joining section provided at a peripheral edge, and an inner joining section provided at an inner side of the peripheral joining section,
    wherein in order to suppress ejection of an occupant out from a vehicle, a portion of the curtain bag in a width direction of the curtain bag and/or the outer edge is shaped so as to catch a bottom sill of a window over the entire length of the curtain bag in a longitudinal direction of the curtain bag at a time of inflation and deployment, and the inner joining section of a region that contacts a section below the bottom sill of the window is shaped with a plurality of dots, wherein a maximum width of the curtain hag is 1.1 to 1.5 times as large as a maximum width of a window sill.

2. The curtain bag according to claim 1, wherein in order to suppress ejection of an occupant out from a vehicle, the curtain bag has a form inflatable substantially across an entire surface of the curtain bag, and thereby, a tensile force at the fabric being increased.

3. The curtain bag according to claim 1, wherein in order to suppress ejection of an occupant out from a vehicle, a length of a single inner joining section projected in a width direction is 2% to 70% of a maximum width of an inflatable section of the curtain bag, and thereby, a bending stiffness of the curtain bag being increased.

\* \* \* \* \*